(12) United States Patent
Fujii

(10) Patent No.: US 6,772,024 B2
(45) Date of Patent: Aug. 3, 2004

(54) METHOD, APPARATUS AND STORAGE MEDIUM FOR ADJUSTING THE PHASE OF SOUND FROM MULTIPLE SPEAKER UNITS

(75) Inventor: Kazuo Fujii, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 580 days.

(21) Appl. No.: 09/755,804

(22) Filed: Jan. 5, 2001

(65) Prior Publication Data

US 2001/0022842 A1 Sep. 20, 2001

(30) Foreign Application Priority Data

Jan. 6, 2000 (JP) ........................................ 2000-001068

(51) Int. Cl.⁷ ............................................... G06F 17/00
(52) U.S. Cl. ........................................... 700/94; 381/97
(58) Field of Search ........................... 381/307, 97, 89, 381/58, 59, 56, 57, 304; 700/94

(56) References Cited

U.S. PATENT DOCUMENTS 6,111,957 A * 8/2000 Thomasson ................... 381/15
6,195,435 B1 * 2/2001 Kitamura ...................... 381/18

* cited by examiner

Primary Examiner—Minsun Oh Harvey
Assistant Examiner—Corey Chau
(74) Attorney, Agent, or Firm—George E. Grosser

(57) ABSTRACT

In a method for adjusting the phase of a sound signal from multiple speaker units connected to a computer (e.g. a PC), a microphone is installed at a user's listening position, a reference sound is generated from a single particular speaker unit based on a reference sound data having a certain waveform, a phase difference between the reference sound data and a sound detected by the microphone is calculated for each of the speakers, an average value $q_F$ of the phase differences for front speakers and an average value $q_R$ of the phase differences for rear speakers are respectively calculated, and if $|q_F - q_R| \geq 90°$, phases of the sound data output to the rear speakers are inverted.

8 Claims, 9 Drawing Sheets

METHOD, APPARATUS AND STORAGE MEDIUM FOR ADJUSTING THE PHASE OF SOUND FROM MULTIPLE SPEAKER UNITS

FIELD OF THE INVENTION

The present invention relates to a method for adjusting phase to lessen a deviation of the phases of sounds generated from a plurality of speaker units; a sound reproducing apparatus to which the method for adjusting phase is applied; and a storage medium which records a program for implementing the method for adjusting phase by means of a computer provided with a feature serving as the sound reproducing apparatus.

BACKGROUND OF THE INVENTION

In recent years, computers which are provided with a feature for reading out and reproducing image data and sound data recorded on a DVD (Digital Versatile Disk/Digital Video Disk) (hereinafter, simply referred to as a DVD feature) have been on the market. The sound data recorded on the sound track of the DVD is the data which is provided by compressing five channels of sound data having been subjected to signal processing to produce a sound effect which adds realism (surrounding effect) by encoding them using a coding scheme referred to as AC-3. In order to provide the surrounding effect when the sound is reproduced, as described in Published Unexamined Patent Application No. 4-318799 and No. 3-18200, it is required to dispose four, five, or more speakers around a listening position, and to cause each speaker to reproduce sound individually.

As the utilization of computers becomes more sophisticated and diversified, audio features, such as one for reproducing the sound data as an actual sound via speakers, are becoming indispensable features for computers (in particular, personal computers). In computers provided with the DVD function, in order to provide the surrounding effect when the DVD is replayed, they are designed to be equipped with an advanced audio feature which can reproduce a plurality of channels of sound data obtained by decoding the sound data read from the sound track of the DVD, as a sound of high quality via a plurality of speakers (for example, four speakers).

In contrast, since a typical computer is generally sold in a configuration including two speaker units for making the stereophonic reproduction of sounds possible, a user having a computer with the DVD function, and desiring to provide the surrounding effect when the DVD is replayed, has provided the surrounding effect when the DVD is replayed by additionally purchasing at least two speaker units (for example speaker units for disposal in the rear of the listening position), and connecting them to the computer to use them in combination with the speaker units included with the computer.

For reference sake, use of additional speaker units is not confined to the case where it is desired to provide the surrounding effect when the DVD is replayed. For example, some applications, such as game software being currently on the market in large quantity, may output four channels of sound data, and in the case where it is desired to reproduce more powerful sound when such an application is executed, additional speaker units may also be purchased and connected to the computer.

Figure 9:
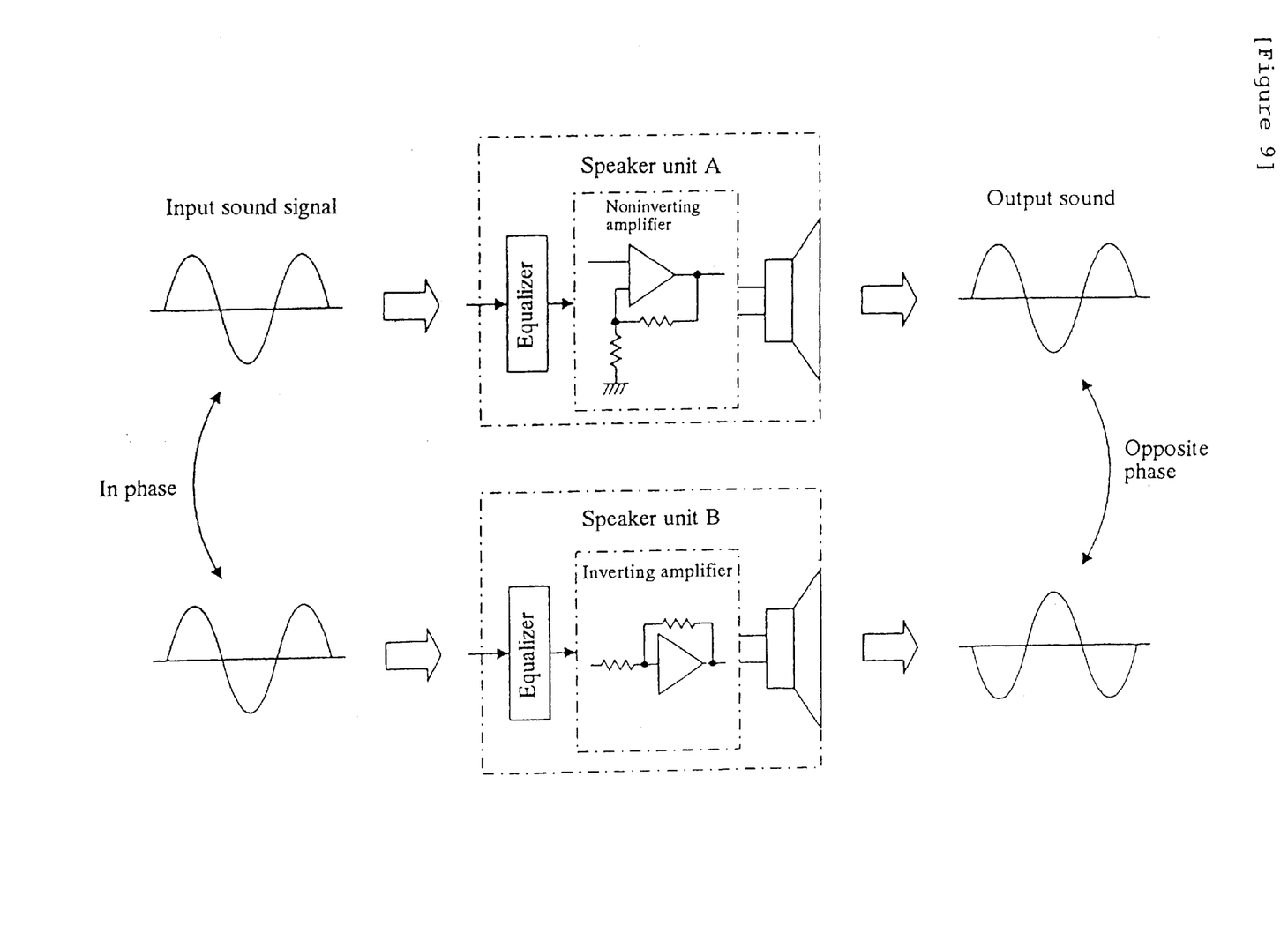
FIG. 9 is a conceptual view showing an example of the cause of a sound signal input to a speaker unit and a sound signal output from a speaker unit having opposite phases.

In commercially available speaker units which are sold for connection to computers, however, speaker units configured to generate sound 180° out of phase with the sound signal input to the speaker units (sounds of opposite phases) (speaker units which are not in conformity with the JIS) are included. Since the phase relationship between the sound signal input to a speaker unit and the sound generated by the speaker unit is, as shown in FIG. 9 by way of example, varied due to various factors, such as whether the amplifier integrated into the speaker unit is a noninverting amplifier or an inverting amplifier, speaker units which generate sound of opposite phase to the sound signal input thereto are on the market in large quantity.

Therefore, the speaker units additionally purchased by a user may often be the speaker units which are configured to generate sounds of opposite phases as described above. In this case, there is a problem that the quality of the reproduced sound is significantly deteriorated because the sounds generated from the speaker units, for example, disposed in front of the listening position, and the sounds generated from the speaker units disposed in the rear of the listening position have opposite phases and cancel each other.

The present invention is provided in consideration of the facts described above, and an object of the present invention is to provide a method for adjusting phase, a sound reproducing unit, and a recording medium, which can avoid a significant deterioration of the quality of the reproduced sound regardless of the configurations of the speaker units used for reproducing sound.

SUMMARY OF THE INVENTION

In order to attain the object described above, in the method for adjusting phase according to the present invention, with a plurality of speaker units (two, four, or more) being respectively disposed at different positions for reproducing sound, a following procedure is performed for each of the plurality of speaker units, the procedure including inputting a predetermined reference sound signal to a single speaker unit, detecting a sound generated from the single speaker unit with sound detecting means disposed at a predetermined position for listening (for example, a position where a listener is situated at the time of listening sound), and detecting the phase difference between a sound signal output from the sound detecting means in response to the sound and the predetermined reference sound signal.

For example, where the number of speaker units is two, the speaker units may be situated at the right and left sides of the listening position, toward the front, and are substantially equidistant from the listening position. Where the number of speaker units is four, the positions where they may be disposed may comprise four positions which include the above-mentioned two positions, and two positions situated at the right and left sides of the listening position, toward the rear, and are substantially equidistant from the listening position. When the number of speaker units is five, the positions where they may be disposed comprise five positions which include the above-mentioned four positions, and a position situated at the center of the listening position, toward the front, and are substantially equidistant from the listening position.

The above-mentioned detection of the phase difference allows a phase difference between a sound signal input to a speaker unit and a sound generated by the speaker unit and listened at the listening position to be detected for each of a plurality of speaker units, and therefore, for example, even if a speaker unit configured to generate a sound of opposite phase to the sound signal input thereto is mixed in the plurality of speaker units, the significant difference between the detected phase difference values for this speaker unit and for the other speaker units allows the presence of the speaker unit of the above-mentioned configuration to be sensed.

Furthermore, in the method for adjusting phase according to the present invention, the phases of the sound signals which are input to each speaker unit when reproducing sound are altered relative to each other so that the deviation of the phase difference detected for each of the plurality of speaker units respectively is lessened. Changing the phases of the sound signals relative to each other may be accomplished by, for example, inverting the phases of the sound signals which are input to a particular speaker unit when reproducing sound, or changing the phases by a predetermined amount (for example, an amount corresponding to the deviation of the phase difference).

Thus, even if a speaker unit configured by generating a sound of opposite phase to the sound signal input thereto is mixed in a plurality of speaker units, the sounds individually generated by the plurality of speaker units when reproducing sound may be prevented from having phases that cancel each other at the listening position, so that a significant deterioration of the quality of the reproduced sound can be avoided regardless of the configurations of the speaker units used for reproducing sound.

Furthermore, the sound reproducing unit according to the present invention is provided with sound signal generating means that generates a plurality of channels of sound signals intended to be input to a plurality of speaker units respectively. Here, the sound reproducing unit according to the present invention may be a device having a function of reproducing sound via a plurality of speaker units, and as described below, it may be a computer or audio equipment. If the sound reproducing unit according to the present invention is a computer, some or all of the plurality of speaker units according to the present invention may be external speaker units connected to sound signal output terminals of the computer.

Furthermore, for the above-mentioned sound signal generating means, a configuration may be adopted that is designed, for example, to generate a plurality of channels of sound signals by reading data recorded on the sound track of the DVD, and decoding the read data. Here, it is also possible to adopt other configurations, including a configuration that is designed to acquire data by reading sound data from media other than DVD, such as a CD or the like, on which digital sound data is recorded, or by receiving sound data from other information processing devices via a communication line, and to convert the acquired sound data into sound signals to generate a plurality of channels of sound signals, or a configuration that is designed to read sound signal from media on which analog sound signal is recorded, such as an audio tape, to generate a plurality of channels of sound signals.

The sound reproducing unit according to the present invention is provided with means for detecting phase difference that, for each of a plurality of speaker units, inputs a predetermined reference sound signal to a single speaker unit of the plurality of speaker units, and detects phase difference between the predetermined reference sound signal and a sound signal output from the sound detecting means as a result of detecting a sound generated from the single speaker unit with sound detecting means disposed at a predetermined listening position, and phase adjusting means alters phase of a sound signal input to each speaker unit from the sound signal generating means relative to each other to lessen a deviation of the phase difference detected for each of the plurality of speaker units respectively. Therefore, as with the method for adjusting phase according to the present invention, a significant deterioration of the quality of the reproduced sound can be avoided regardless of the configurations of the speaker units used for reproducing sound.

Here, for the phase adjusting means, it is possible to adopt such a configuration that is designed to alter the phases of the sound signals relative to each other by inverting the phases of some of the sound signals according to the present invention input to each speaker unit. For example, if the sound signal generating means is configured to convert digital sound data into analog sound signal and input the analog sound signal to the speaker units to reproduce sound, the above-mentioned inversion of the phases of the sound signals may be accomplished very easily by inverting plus and minus the signs of the sound data. Furthermore, if the sound signal generating means is configured by directly generating sound signals without any conversion from sound data, etc., the inversion of the phases of the sound signals may be accomplished very easily by using an inverting amplifier, etc. Thus, it is possible to simplify the configuration of the phase adjusting means (that is, the configuration for lessening the deviation of the phase difference) by adopting, for the phase adjusting means, a configuration that is designed to alter the phases of the sound signals relative to each other by inverting the phases of the sound signals.

Furthermore, in the present invention, when phases of sound signals are to be altered relative to each other, the speaker unit for which the phase of the sound signal input thereto is altered may be selected arbitrarily from the plurality of speaker units, and if the plurality of speaker units comprises two or more speaker units disposed toward the front of the listening position, and two speaker units intended to provide surrounding effect disposed toward the rear of said listening position, the phase adjusting means may be configured, for example, to alter the phase of the sound signal input to one of the speaker units disposed toward the front of the listening position and speaker units disposed toward the rear of the listening position, to lessen a deviation of the phase difference between the phase difference detected for the speaker units disposed toward the rear of the listening position and phase difference detected for the speaker units disposed toward the front of the listening position.

If the sound reproducing unit according to the present invention is a computer, for a reason that additional speaker units are purchased, the manufacturer and configuration of the speaker units disposed toward the front of the listening position as described above are often different from those of the speaker units disposed toward the rear of the listening position, and thus the sound generated by the speaker units disposed toward the front of the listening position and the sound generated by the speaker units disposed toward the rear of the listening position often have opposite phases. However, on the contrary if the phase adjusting means is configured by altering the phase of the sound signal input to one of the speaker units disposed toward the front of the listening position and speaker units disposed toward the rear of the listening position, with a phase adjusting means having a simple configuration, it is possible to avoid a significant deterioration of the quality of the reproduced sound resulting from the fact that the sound generated by the speaker units disposed toward the front of the listening position and the sound generated by the speaker units disposed toward the rear of the listening position have opposite phases.

According to another aspect of the invention there is provided a recording medium intended to allow a computer to implement the method of adjusting phase comprising a first step of, for each of a plurality of speaker units, inputting a predetermined reference sound signal to a single speaker unit of the plurality of speaker units, and detecting phase difference between the predetermined reference sound signal and a sound signal obtained as a result of detecting a sound generated from the single speaker unit with a sound detecting means disposed at a predetermined listening position, and second step of altering phase of a sound signal input to each speaker unit relative to each other to lessen a deviation of the phase difference detected respectively for each of the plurality of speaker units, by reading out and executing the program recorded on the recording medium by the computer, as with the method for adjusting phase according to the present invention, a significant deterioration of the quality of the reproduced sound can be avoided regardless of the configurations of the speaker units used for reproducing sound.

A preferred embodiment of the invention will now be described, by way of example only, with reference to the accompanying drawings.

DESCRIPTION OF THE PREFERRED EMBODIMENTS

Figure 1:
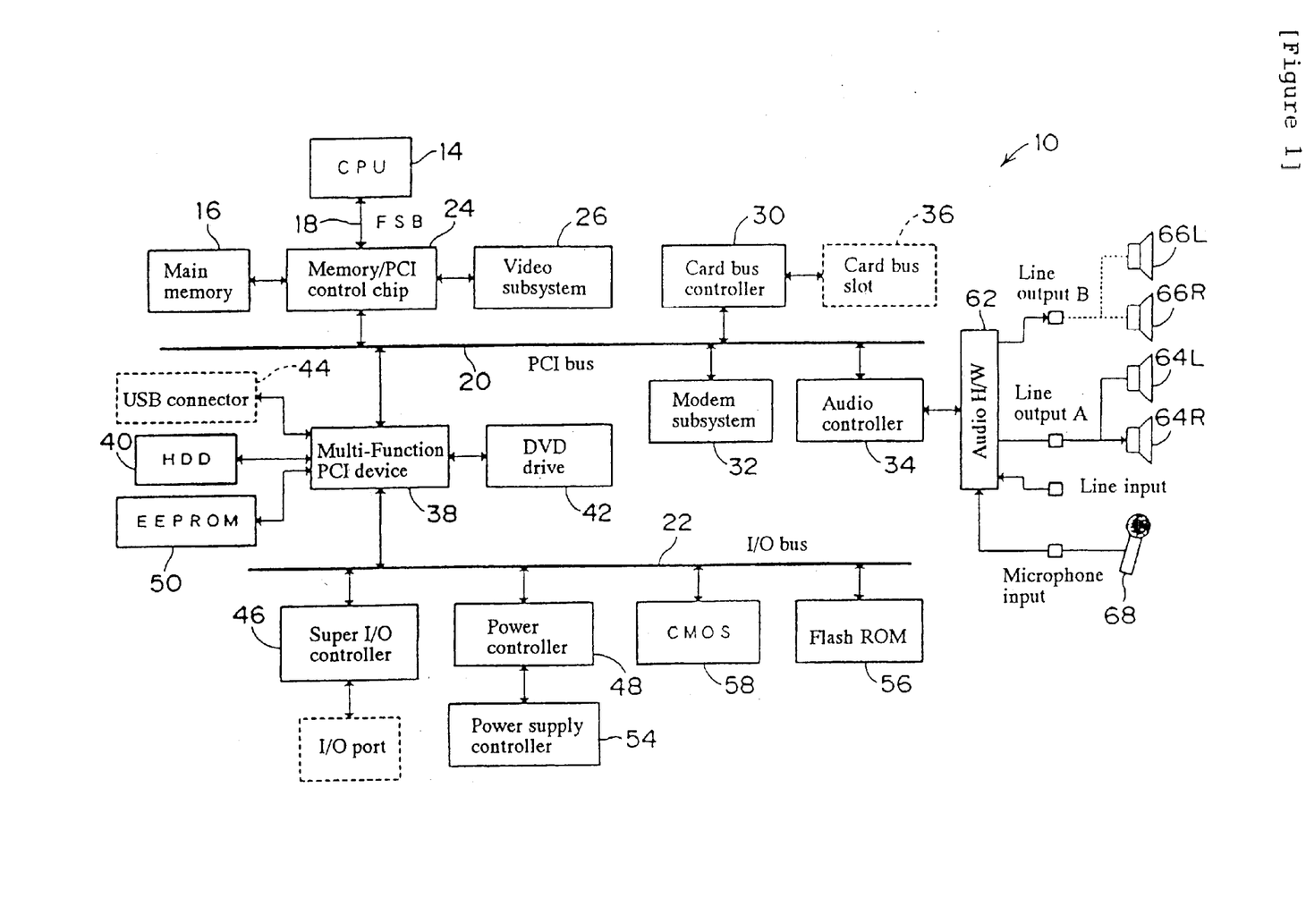
FIG. 1 is a block diagram showing a schematic configuration of a computer system according to the present invention.

Referring to the drawings, an exemplary embodiment of the present invention will be described in detail below. In FIG. 1, a hardware configuration of a computer system 10 comprising a typical personal computer (PC) suited to implement the present invention is diagrammatically shown on a subsystem basis. Examples of PC for implementing the present invention include a desktop PC 12 (see FIG. 2) which is in conformity with the specification OADG (PC Open Architecture Developer's Group), and adopts the "Windows 98 or NT" available from Microsoft Corp. in the US, or the "OS/2" available from International Business Machines Corporation (IBM) in the US as the operating system (OS). Each part of the computer system 10 will be described below.

The CPU 14, which is a brain of the entire computer system 10, executes a variety of programs under the control of the OS. The CPU 14 may be one or more of a variety of CPU chips produced by Intel Corp. in the US, such as "Pentium," "Pentium MMX" or "Pentium Pro," CPUs produced by the other company, such as AMD, or "PowerPC" produced by IBM Corp. The CPU 14 is configured by including an L2 (level 2) cache, which is the high speed memory intended to reduce the total access time to the main memory 16 by temporarily storing limited codes and data which are frequently accessed. The L2 cache generally comprises SRAM (static RAM) chips, and has a storage capacity of, for example, 512 kB or more.

The CPU 14 is interconnected to each of hardware components described below via a three level bus including a Front Side Bus (FSB) 18 serving as a processor direct-coupled bus directly coupled to its own external pin, a PCI (Peripheral Component Interconnect) bus 20 serving as a high speed bus for I/O devices, and an I/O bus 22 comprised of an ISA (Industry Standard Architecture) bus, etc. serving as a low speed bus for I/O devices. The FSB 18 and PCI bus 20 are linked together by a bridge circuit (host-PCI bridge) commonly referred to as a memory/PCI control chip 24. The memory/PCI control chip 24 in this embodiment is configured by including a memory controller feature for controlling the access operation to the main memory 16, a data buffer for accommodating the difference of the data rates between the FSB 18 and the PCI bus 20, and so on. For example, the 440 EX, or the 440 GX, etc. produced by Intel Corp. may be used.

The main memory 16 is a writable memory utilized as a read-in area for the executor of the CPU 14, or as a work area for the processed data of the executor to be written. The main memory 16 generally comprises a plurality of DRAM (dynamic RAM) chips, and, for example, has a standard storage capacity of 32 MB, and can be added up to 256 MB. In recent years, in order to serve the need for speedup, the DRAM is being replaced with a fast page mode DRAM, an EDO DRAM, a synchronous DRAM (SDRAM), a burst mode EDO DRAM, and a RDRAM, etc.

Here, the executor, described herein, includes an OS, such as Windows 98, various kinds of device drivers for hardware operating peripheral devices, application-specific application programs, and firmware, such as a BIOS (Basic Input/Output System: a program for controlling the input and output operations of hardware, such as a keyboard 60 (see FIG. 2), or a floppy disk drive) stored in a flash ROM 56 (as described in detail below).

The PCI bus 20 is a type of bus which can transmit data at a relatively high speed (for example, it has a bus width of 32/64 bits, a maximum operating frequency of 33/66/100 MHz, and a maximum data rate of 132/264 MBps), and PCI devices which drive at relatively high speeds, such as a card bus controller 30, are connected thereto. The PCI architecture provides the so-called PnP (plug and play) function.

Figure 2:
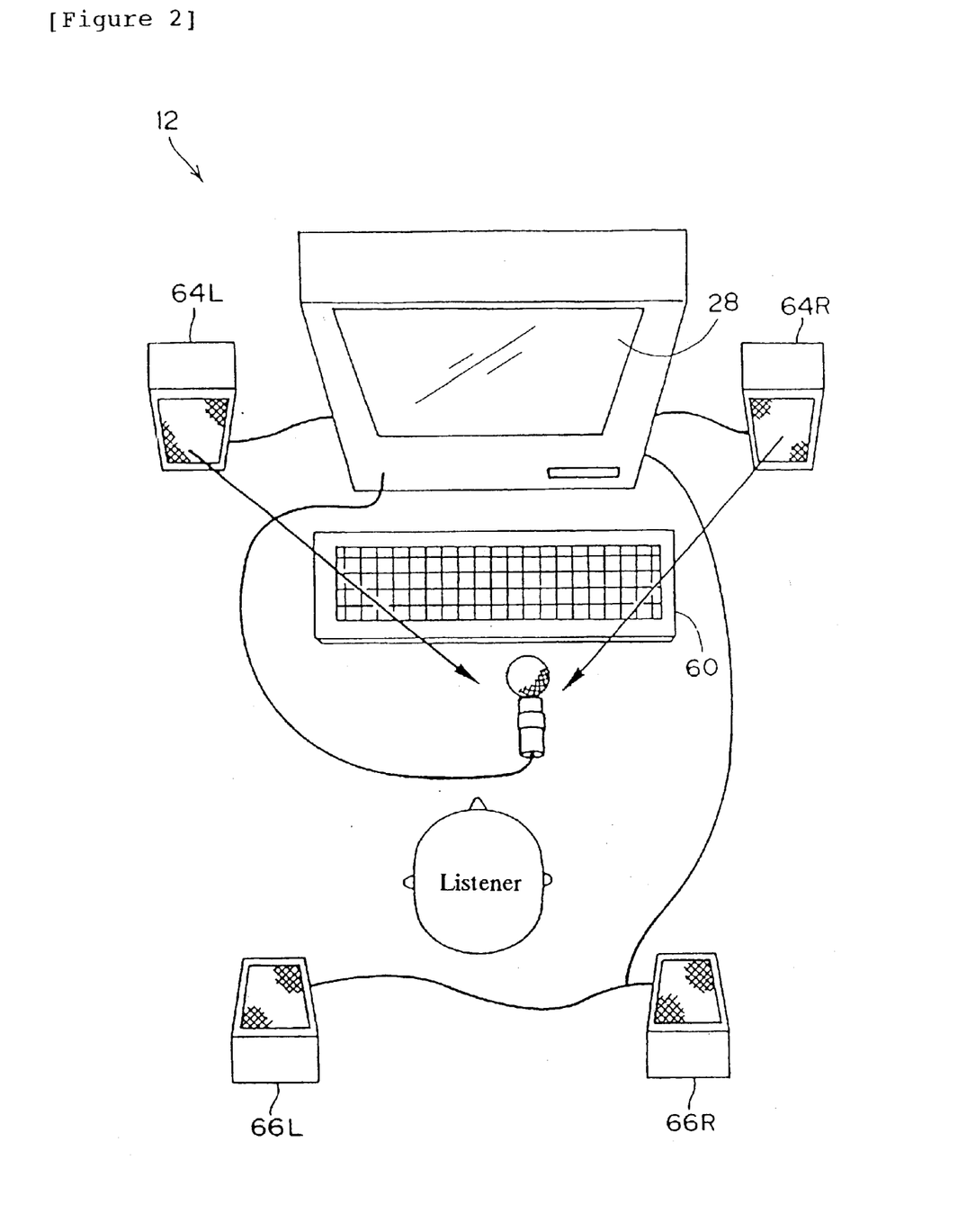
FIG. 2 is a perspective view showing a disposition or the like of a desktop PC, and a disposition of speaker units and microphone during execution of a phase adjustment process.

The video subsystem 26 is a subsystem for providing functions associated with video, and comprises a video controller for actually processing picture description instructions from the CPU 14, and temporarily writing the processed picture information into the video memory (VRAM), as well as reading the picture information from the VRAM and outputting it as a picture data on the liquid crystal display (LCD) 28 (see FIG. 2). Further more, the video controller can convert digital video signals into analog video signals by means of the attached digital-to-analog converter (DAC). Analog video signals are output to a CRT port (not shown) via a signal line.

In addition, the card bus controller 30, a modem subsystem 32, and an audio controller 34 are individually connected to the PCI bus 20. The card bus controller 30 is a dedicated controller for directly coupling bus signals of the PCI bus 20 to an interface connector (card bus) of a PCI card bus slot 36. The card bus slot 36 is loaded, for example, with PC cards (not shown) which are disposed on the wall of the body of the PC 12, and are in conformity with specifications (for example, "PC Card Standard 95") defined by the PCMCIA (Personal Computer Memory Association)/JEIDA (Japan Electronic Industry Development Association).

Communication lines, such as a LAN or a telephone line, are connected to the modem subsystem 32. The computer system 10 can connect to Internet via these communication lines.

An audio hardware circuit 62 (hereinafter, referred to as an audio H/W 62) is connected to the audio controller 34, and various kinds of terminals (in particular, a line output terminal A, a line output terminal B, a line input terminal, and a microphone input terminal) for inputting and outputting audio signals, which are provided on the back of the PC 12, etc., are individually connected to the audio H/W 62. A pair of speaker units (front speaker units with an integrated amplifier 64L and 64R), which is intended to be disposed on the right and left sides of the LCD 28 (that is, it is disposed at the right and left sides, toward the front, of the user's position when the DVD is replayed (hereinafter referred to as the listening position)) as shown in FIG. 2, is included with the PC 12 according to the present invention, and these front speaker units 64L and 64R are connected to the line output terminal A.

If a user expects the surrounding effect when the DVD is replayed, and additionally purchases a pair of speaker units intended to be disposed at the right and left sides of the listening position, toward the rear, as shown in FIG. 2 (rear speaker units with an integrated amplifier 66L and 66R), these rear speaker units 66L and 66R are connected to the line output terminal B. The audio H/W 62 has integrated D/A converter and amplifier (both not shown), and when the sound data is input thereto from the audio controller 34, converts the input sound data into analog sound signals, amplifies them, and outputs them to the speaker units connected to the line output terminals.

A microphone 68 is connected to the microphone input terminal, and various kinds of devices, which output analog sound signals, are connected to the line input terminal. The audio H/W 62 has integrated A/D converter and amplifier (both not shown), and when the analog sound signals are input thereto from the microphone input terminal or line input terminal, amplifies the input sound signals to a certain level, converts them into digital sound data, and outputs them to the audio controller 34. The audio controller 34 supports functions, such as mixing of the analog sound signals.

The PCI bus 20 and the I/O bus 22 are interconnected via a multi-function PCI device 38. The multi-function PCI device 38 has functions of a bridge between the PCI bus 20 and the I/O bus 22, a DMA controller, a programmable interrupt controller (PIC), a programmable interval timer (PIT), an IDE (Integrated Drive Electronics) interface, a USB (Universal Serial Bus), and an SMB (System Management Bus) interface, and for example, a device of the PIIX4 produced by the Intel Corp. may be used.

Here, the function of the DMA controller is a function of transferring data between peripheral equipment (for example, FDD) and the main memory 16 without intermediation of the CPU 14. And, the function of the PIC is a function of causing a predetermined program (interrupt handler) to be executed in response to an interrupt request (IRQ) from peripheral equipment. And, the function of the PIT is a function of generating timer signals at a predetermined period, which is programmable.

Furthermore, an IDE hard disk drive (HDD) 40 is connected to the IDE interface provided by the IDE interface function, and in this embodiment, a DVD (Digital Video Disc or Digital Versatile Disc) drive 42 is ATAPI (AT Attachment Packet Interface) connected to the IDE interface as well. And, instead of the DVD drive 42, other types of IDE device, such as an IDE CD-ROM drive, may be connected thereto. The external storage devices, such as an HDD 40, or a DVD drive 42, are, for example, housed in a housing area within the body of the PC 12 referred to as a "media bay" or "device bay." In some cases, the standard equipment of these external storage devices may be mounted replaceably with other devices, such as an FDD, or a battery pack, and exclusively.

Furthermore, a USB port is provided on the multi-function PCI device 38, and this USB port is connected to a USB connector 44 provided, for example, on the wall of the body of the PC 12. The USB supports functions of inserting and extracting a new peripheral device (USB device) while the power is on (a hot plugging function), and of automatically recognizing the newly connected peripheral device and resetting the system configuration (a plug and play function). A maximum of 63 USB devices may be daisy-chained to one USB port. Examples of the USB device include a keyboard, mouse, joystick, scanner, printer, modem, display monitor, and tablet, etc.

In addition, an EEPROM 50 is connected to the multi-function PCI device 38 via an SM bus. The EEPROM 50 is a memory for maintaining information, such as a password registered by a user, a supervisor password, and a serial number of the product. It is nonvolatile, and the contents stored in it are electrically rewritable. The I/O bus 22 is a bus which has a data rate slower than that of the PCI bus 20 (for example, a bus width of 16 bits, and a maximum data rate of 4 MBps), and is used for connecting together a Super I/O controller 46, a power controller 48, a flash ROM 56 comprised of EEPROMs, etc., and CMOS 58, as well as peripheral devices (all not shown) which run at relatively low speeds, such as a real time clock (RTC), or keyboard/mouse controller.

An I/O port is connected to the Super I/O controller 46, and the Super I/O controller is a peripheral controller for controlling driving of the floppy disk drive (FDD), parallel data input/output (PIO) via a parallel port, and serial data input/output (SIO) via a serial port.

The power controller 48 mainly performs power management and thermal management of the computer system 10, and may be constructed of a single chip microcomputer provided with MPUs, RAMs, ROMs, and timers, etc. In the ROMs, programs and look-up tables required to perform the power management and thermal management are stored. A power supply controller 54 is connected to the power controller 48. The power supply controller 54 includes an AC/DC converter, and a DC/DC converter for generating DC constant-voltages of 5 V, 3.3 V, etc. used in the computer system 10, and performs the power control under the control of the power controller 48.

The flash ROM 56 is a memory for maintaining programs of firmware, such as a BIOS, or a bootstrap code. It is nonvolatile, and the contents stored in it are electrically rewritable. And, the CMOS 58 is configured by connecting a semiconductor memory to a backup power. It is nonvolatile, and functions as a high speed storage means.

Here, in order to configure the computer system 10, many electric circuits other than those shown in FIG. 1 are needed. However, they are well-known to those skilled in the art, and do not constitute a critical part of the present invention, so that explanations of them are omitted herein. Furthermore, it is also noted that, in order to avoid confusing the drawings, connections between the hardware blocks in the figures are shown only in part.

Next, the operation of this embodiment will be described. In this embodiment, programs for adjusting phase and programs for inverting phase, which are intended to implement the method for adjusting phase according to the present invention, are included in a group of programs for replaying the DVD which are executed when the DVD is replayed (or when the image data and sound data recorded therein are reproduced). Initially, together with other application programs, the group of programs for replaying the DVD is stored in information storage medium (corresponding to the recording medium according to the present invention), such as a floppy disk, or a CD-ROM.

With the information storage medium being loaded into the corresponding drives (such as a floppy disk drive, or a CD-ROM drive), when an instruction is provided that installation from the information storage medium should be performed, the group of programs for replaying the DVD is read from the information storage medium by the drive into which the information storage medium is loaded, and is stored in the HDD 40.

Then, the DVD, on which the image data and sound data are recorded, is loaded into the DVD drive 42, and when an instruction is provided that the DVD should be replayed, the group of programs for replaying the DVD is read from the HDD 40, and executed by the CPU 14. Thus, the PC 12 functions as the sound reproducing units according to the present invention. In this way, the information storage medium storing the group of programs for replaying the DVD corresponds to the recording medium according to the present invention.

Figure 3:
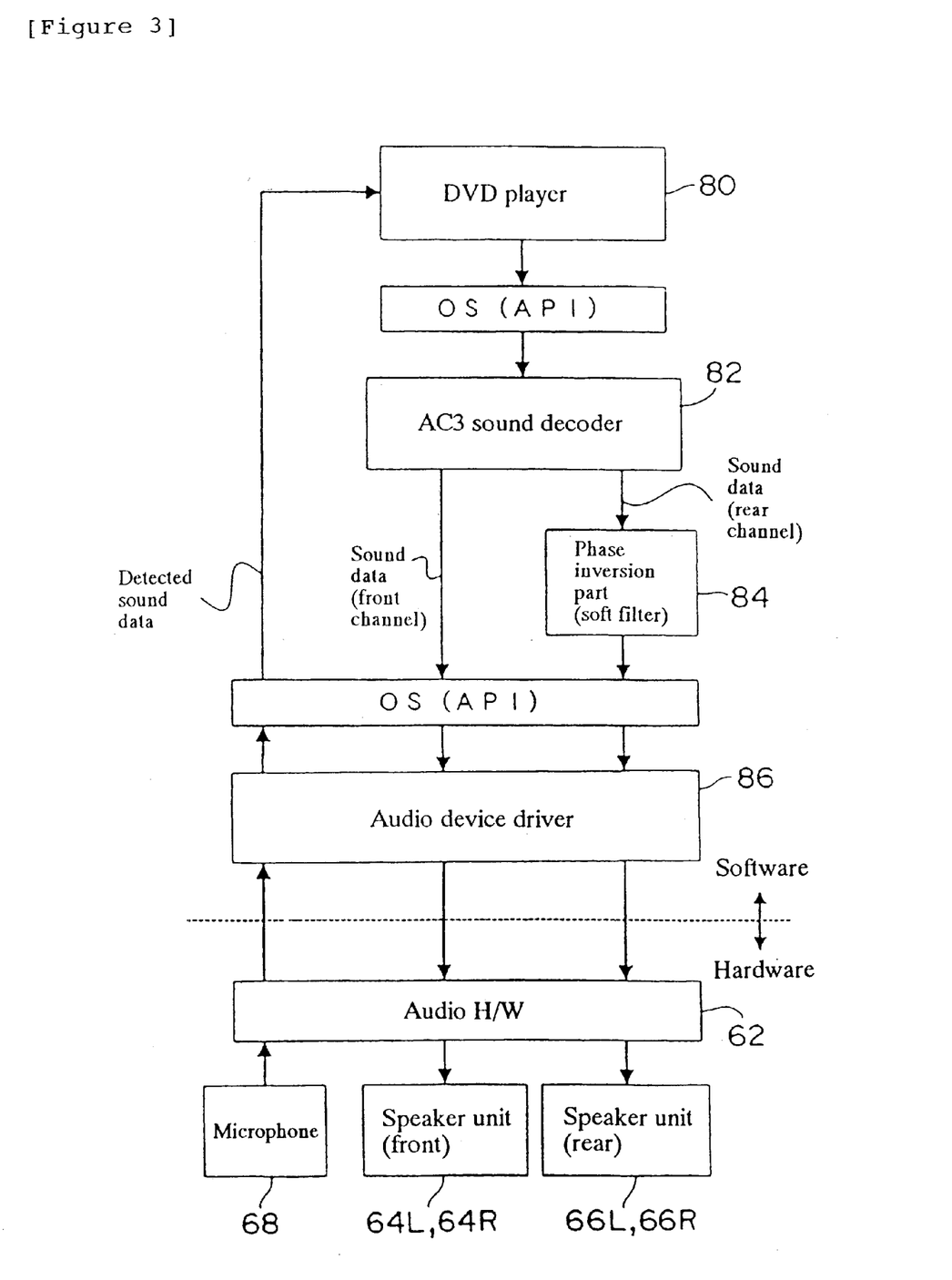
FIG. 3 is a conceptual view showing software and hardware associated with the replay of the DVD and phase adjustment.

Next, a replay of the DVD will be described. As shown in FIG. 3, the program for replaying the DVD is constructed of modules of the DVD player 80, AC3 sound decoder 82, and phase inversion part 84, and the DVD is replayed by the CPU 14 executing programs corresponding to these modules. Here, the above-mentioned program for adjusting phase is contained in the DVD player 80, and the phase inversion part 84 is provided by the above-mentioned program for inverting phase.

Figure 4:
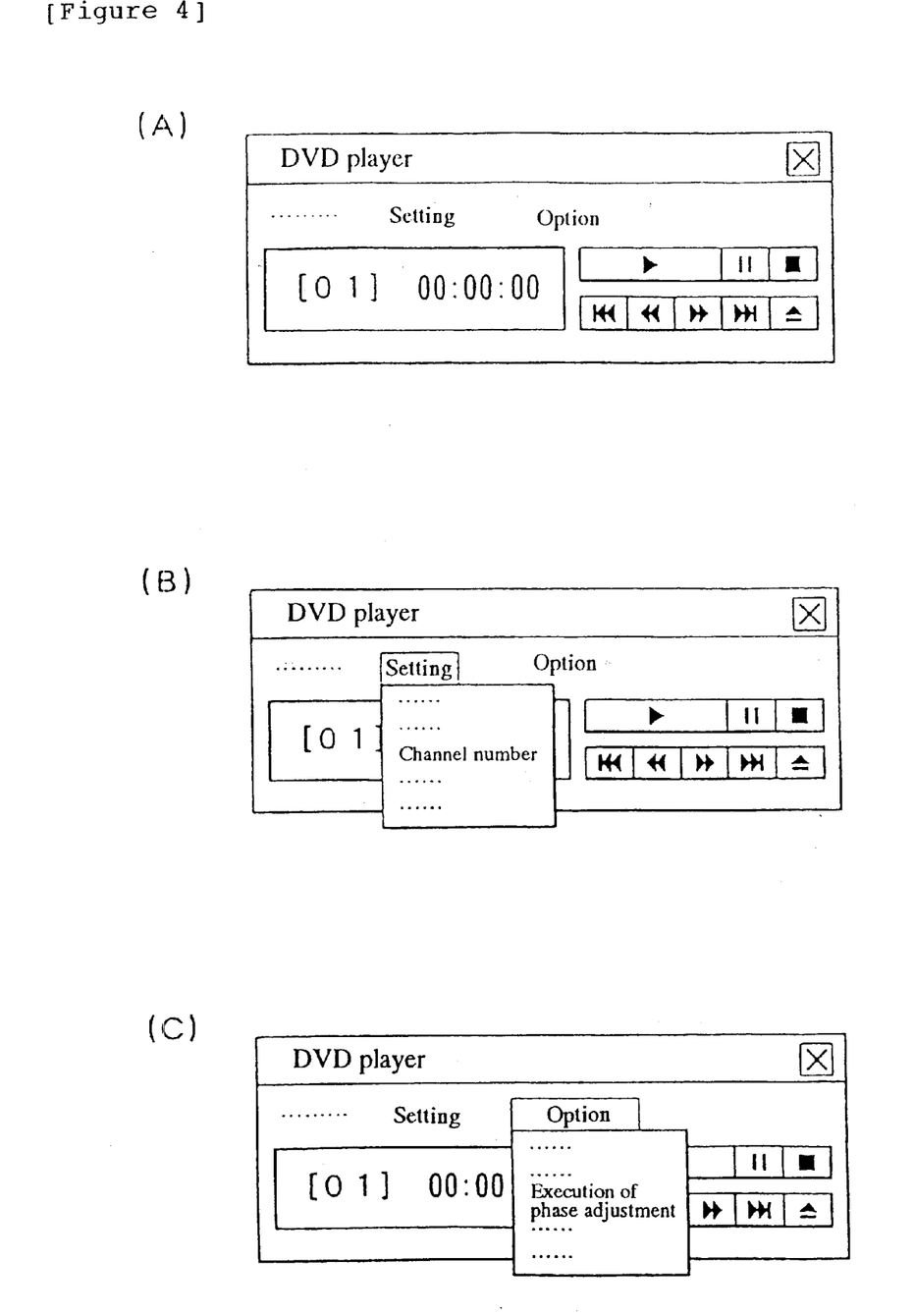
FIGS. 4(A) to 4(C) are a conceptual views showing an example of the window displayed on the LCD by the DVD player.

The DVD player 80 is a module which is responsible for controlling the user interface and DVD drive 42 when the DVD is replayed. For example, when the DVD is loaded into the DVD drive 42, and it is sensed that the loaded DVD is a DVD on which the image data and sound data are recorded, a window is displayed on the LCD 28 as shown in FIG. 4(A), for example, by which user can instruct a replay of the DVD.

Then, when the user provides an instruction that the replay of the DVD should be performed after clicking on the replay button within the window displayed on the LCD 28, the DVD drive 42 is instructed via the OS and DVD device driver to read the image data and sound data recorded on the DVD, and the image data read out from the image track of the DVD by the DVD drive 42 is transferred to the video subsystem 26 (thereby, the image is displayed on the LCD 28), and simultaneously the sound data read out from the sound track of the DVD is transferred to the AC3 sound decoder 82 via the OS (API).

The sound data recorded on the sound track of the DVD is the data which is provided by compressing five channels of sound data having been subjected to signal processing to produce a sound effect which adds realism (surrounding effect) by encoding them using a coding scheme referred to as AC-3, and the AC3 sound decoder 82 decodes the sound data transferred from the DVD player 80, and generates five channels of sound data.

In a typical disposition of the speakers to provide the surrounding effect, each of the speakers is disposed at the left side toward the front (FL), the center toward the front (FC), the right side toward the front (FR), the left side toward the rear (RL), and the right side toward the rear (RR), respectively, and a subwoofer is furthermore provided. When such a disposition of the speakers is provided, the sound data for the subwoofer may be generated from the generated five channels of sound data, thereby the sound data representing the sound that each of the speakers should generate (5.1 channels of sound data) may be obtained. However, since the PC 12 is commercially available with only two channels of speakers (front speaker units 64L and 64R) being included with it, and has, in some cases, a configuration in which two more channels of speakers (rear speaker units 66L and 66R) are added (in this case, the number of the channels is four), the number of the speakers (channels) is less and inconstant in comparison with that of the typical disposition of the speakers. Therefore, as shown in FIG. 4(B) by way of example, the number of channels used when the DVD is replayed may be set by the user, and the number of channels set by the user is notified from the DVD player 80 to the AC3 sound decoder 82 via the OS (API).

If the notified number of the channels is four, the AC3 sound decoder 82 generates and outputs four channels of sound data (FL, FR, RL, and RR) out of the generated five channels of sound data by allocating the sound data of the FC channel to the FL channel and FR channel. Alternatively, if the notified number of the channels is two, it generates four channels of sound data as described above, and then combines the sound data of the RL channel and the sound data of the FL channel, and simultaneously combines the sound data of the RR channel and the sound data of the FR channel, to generate and output two channels of sound data (FL, FR).

The sound data output from the AC3 sound decoder 82 is transferred to the audio H/W 62 via the OS (API) and the audio device driver 86. Here, although in FIG. 3, the sound data of the rear channels (RL channel and RR channel) is shown to be output from the AC3 sound decoder 82 via the phase inversion part 84, it is typically output from the AC3 sound decoder 82, bypassing the phase inversion part 84 (the case where it passes through the phase inversion part 84 will be described below). The audio H/W 62 converts individually the plurality of channels of input sound data into the analog sound signals (D/A conversion), and outputs them to their respective corresponding speaker units. Thereby, the sound data recorded on the sound track of the DVD is reproduced as an actual sound with the surrounding effect, and the sound with the surrounding effect is listened by the user situated at the listening position (listener). In this way, the DVD player 80, AC3 sound decoder 82, and audio H/W 62 have a feature that serves as the sound signal generating means according to the present invention.

Figure 5:
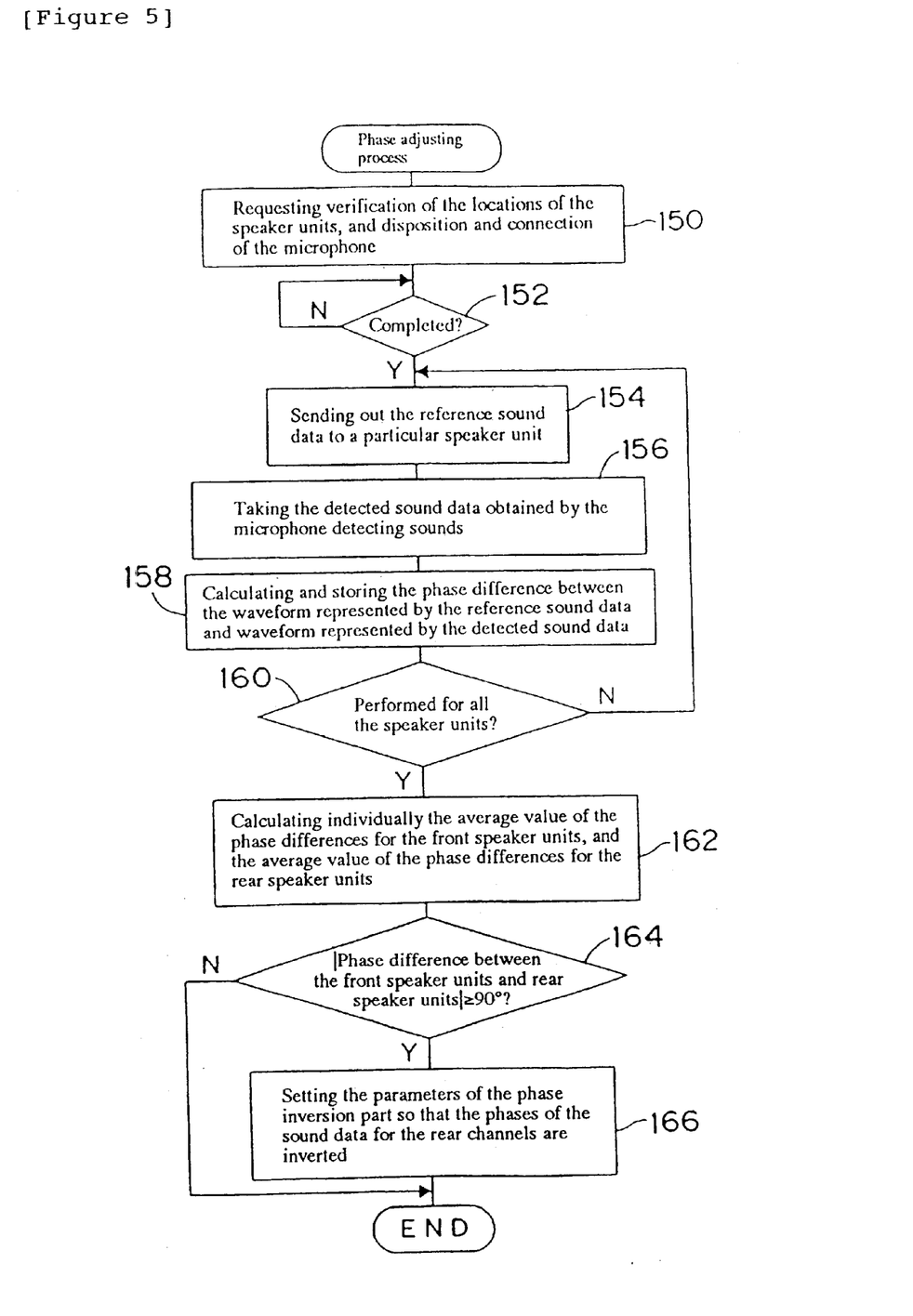
FIG. 5 is a flowchart showing the contents of the phase adjustment process.

Next, referring to the flowchart in FIG. 5, the phase adjustment process implemented by the CPU 14 executing the program for adjusting phase in the DVD player 80 will be described. Here, this phase adjustment process is a process which is recommended to be performed in cases, for example, where the rear speaker units 66L and 66R are added, so that there are four speaker units, or some or whole of the speaker units are replaced. As shown in FIG. 4(C) by way of example, it is performed by an instruction from the user to execute the phase adjustment.

In step 150, a message is displayed on the LCD 28, which requests verification whether the front speaker units 64L, 64R, and the rear speaker units 66L, 66R are disposed at the positions where it is desirable that they are located when the sound is listened (for example, the positions that are equidistant from the listening position) or not, installation of the microphone 68 at the listening position where the user is situated when listening the sound, and connection of the microphone 68 to the microphone input terminal of the PC 12, to cause the user to carry out the above-mentioned tasks of verification of each position where each speaker unit is disposed, and installation and connection of the microphone 68.

In the following step 152, it is determined whether the above-mentioned works are completed or not, and the process is in waiting state till the determination is affirmed. When the user manipulates the keyboard 60 or mouse to input the information that indicates the completion of the above-mentioned works, the determination in step 152 is affirmed, and the process goes to step 154, and in this step, the reference sound data that has been stored in advance is output to a single particular speaker unit.

In this embodiment, the sound data that represents a sound wave having a sinusoidal waveform of a frequency of 1 kHz is used as an example of the reference sound data. The reference sound data is converted by the audio H/W 62 into the analog sound signals, and input to the single particular speaker unit, thereby the sound wave having a sinusoidal waveform of a frequency of 1 kHz is generated from the single particular speaker unit. Furthermore, the sound wave generated from the single particular speaker unit is detected by the microphone 68, then the analog sound signals output from the microphone 68 are converted by the audio H/W 62 into the detected digital sound data (A/D conversion), and input to the DVD player 80 via the audio device driver 86 and OS (API).

Figure 6:
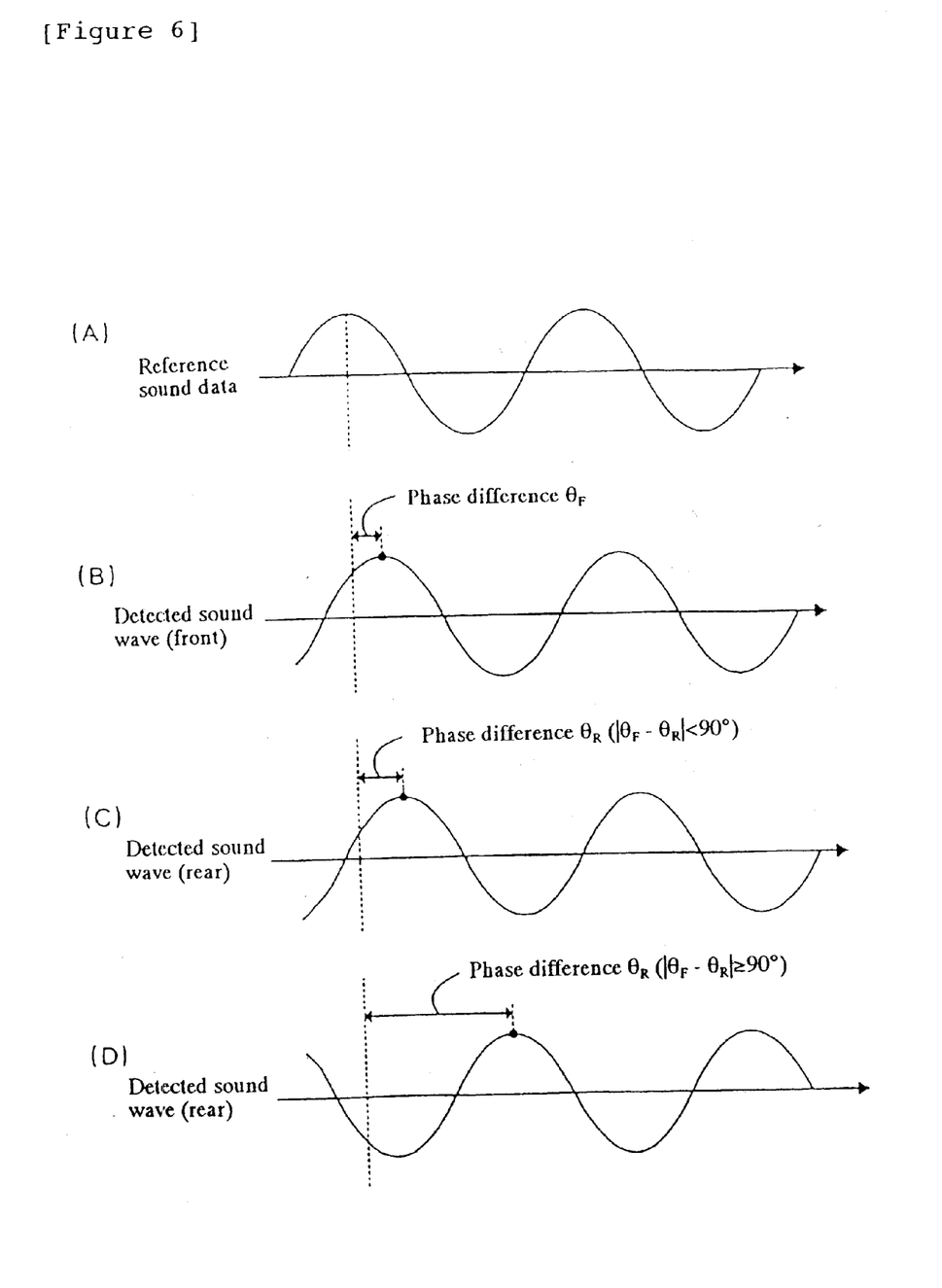
FIG. 6(A) is a graph showing an example of the waveform exhibited by the reference sound data.
FIG. 6(B) is a graph showing an example of the waveform of the sound wave detected when the sound is generated from the front speaker units.
FIGS. 6(C) and 6(D) are graphs showing examples of the waveform of the sound wave detected when the sound is generated from the rear speaker units.

In step 156, the detected sound data that is input from the microphone 68 via the audio H/W 62 and OS is taken, and in the next step 158, for each of the reference sound data output to the single particular speaker unit, and the taken detected sound data, the timing when the peak is reached in each waveform of each of the sound waves represented by each of the sound data is detected, the difference between these timings is calculated, and the result of the calculation is stored as a phase difference q (see FIGS. 6(B) to 6(D)) between the waveform represented by the reference sound data and the waveform represented by the detected sound data.

In the next step 160, it is determined whether or not steps 154 to 158 are performed for all the speaker units connected to the PC 12. If the determination is denied, the process goes back to step 154, and steps 154 to 160 are repeated. In this way, the phase differences q are calculated and stored individually for all the speaker units connected to the PC 12. Here, the above-mentioned steps 154 to 160, in conjunction with a microphone 68 for detecting sound and the audio H/W 62 for converting the sound signals output from the microphone 68 into the digital sound data, correspond to the means for detecting phase difference according to the present invention.

When the determination in step 160 is affirmed, the process goes to step 162, and in this step, the average value $q_F$ of the phase differences calculated for the front speaker units 64L and 64R, and the average value $q_R$ of the phase differences calculated for the rear speaker units 66L and 66R are individually calculated. Then, in the next step 164, it is determined whether the absolute value $|q_F-q_R|$ of the difference between the phase difference $q_F$ of the front speaker units and the phase difference $q_R$ of the rear speaker units (corresponding to the deviation of the phase difference according to the present invention) is equal to or greater than 90° or not.

If the determination is denied (for example, in the case shown in FIG. 6(C)), the phase adjustment process is finished without any processing, but if the determination is affirmed (for example, in the case shown in FIG. 6(D)), the process goes to step 166, and in this step, parameters of the phase inversion part 84 are set so that the phases of the sound data for the rear channels are inverted, before the phase adjustment process is finished. Here, the above-mentioned steps 162 to 166 correspond to the phase adjusting means according to the present invention.

If the parameters of the phase inversion part 84 are set in step 166 as described above, when the DVD is replayed, the phase inversion part 84 is activated, the sound data of the rear channels (RL and RR channels) output from the AC3 sound decoder 82 is input to the phase inversion part 84, has its phase inverted by the phase inversion part 84, and then is output to the audio H/W 62 (see FIG. 3). Thus, the phases of the sounds generated from the rear speaker units 66L and 66R are inverted. Here, since the sound data output from the AC3 sound decoder 82 is a data with a sign, the inversion of the phase of the sound data may be implemented by a very simple process of inverting plus and minus signs of the sound data.

As an example, if the rear speaker units 66L and 66R are configured by generating sounds of opposite phases to the sound signals input thereto, while the front speaker units 64L and 64R are configured by generating sounds in phase with the sound signals input thereto, the value of $|q_F-q_R|$ is 180°, or approaches 180° (see FIG. 6(D) as an example), so that the sounds generated from the front speaker units and the sounds generated from the rear speaker units have often substantially opposite phases (the difference between the phase of the sound signal input to the speaker unit and the phase at the listening position of the sound generated from the speaker unit may vary depending on the distance between the speaker unit and the listening position).

In this case, the quality of the reproduced sound listened by the user is significantly deteriorated. However according to this embodiment, since the phases of the sound signals input to the rear speaker units are inverted by the phase inversion part 84 in such a case, the sounds generated from the front speaker units and the sounds generated from the rear speaker units are substantially in phase at the listening position, so that the quality of the reproduced sound listened by the user is enhanced.

In addition, according to this embodiment, since the phases of the sound signals are inverted not only in the case that the value of $|q_F-q_R|$ is 180°, or approaches 180°, but also in the case that the condition of $|q_F-q_R| \geq 90°$ is met, the phase differences between the sounds generated from the front speaker units and the sounds generated from the rear speaker units may be lessened at the listening position, so that the quality of the reproduced sound listened by the user may be enhanced.

Here, while the signal having a sinusoidal waveform of a constant frequency (1 kHz) is used as the predetermined standard signal in the above description, the frequency and waveform of the predetermined standard signal are not limited to those described above, and any signal having any frequency and waveform may be used. However, considering that the phase difference should be detected, it is preferable to use waveforms whose peak positions are obvious, such as a sinusoidal wave.

Figure 7:
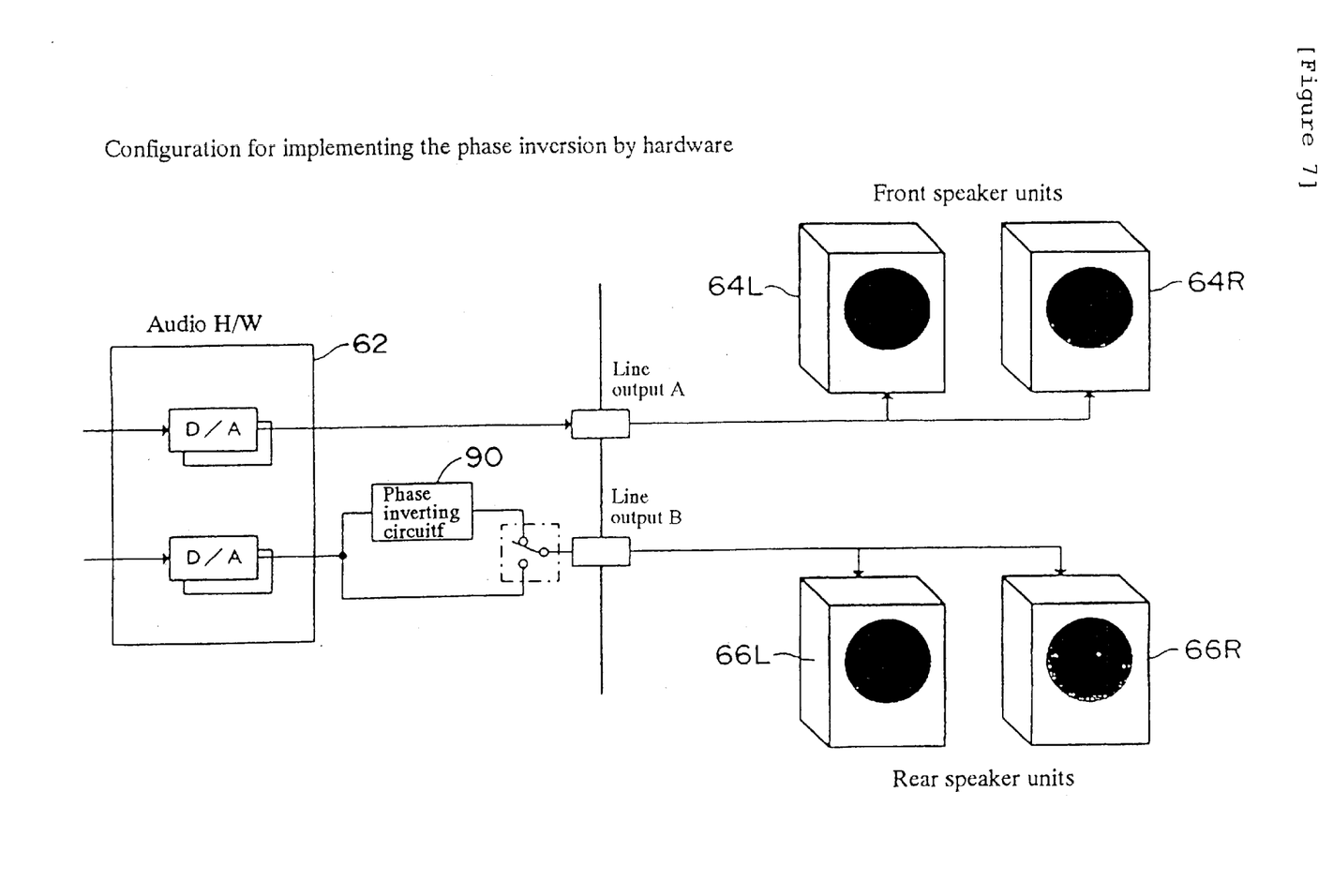
FIG. 7 is a schematic view showing an example of the configuration for performing the phase inversion of the sound signal by hardware.

Furthermore, while the inversion of the phases of the sound signals input to the speaker units is implemented by inverting the plus and minus signs of the digital sound data prior to being converted into the sound signals in the above description, this is not restrictive, and of course, the phases of the analog sound signals may be inverted by the phase inverting circuit 90 comprised of an inverting amplifier, etc., as shown in FIG. 7 as an example.

Furthermore, while the case where the present invention is applied to the desktop PC 12 has been described in the above description, this is not restrictive, and it may be applied to a notebook PC. Since the notebook PC has a compact body, and thus space to provide terminals is limited, it is conceivable that it may be difficult to newly provide terminals intended for the connection of each of the front and rear speaker units.

Figure 8:
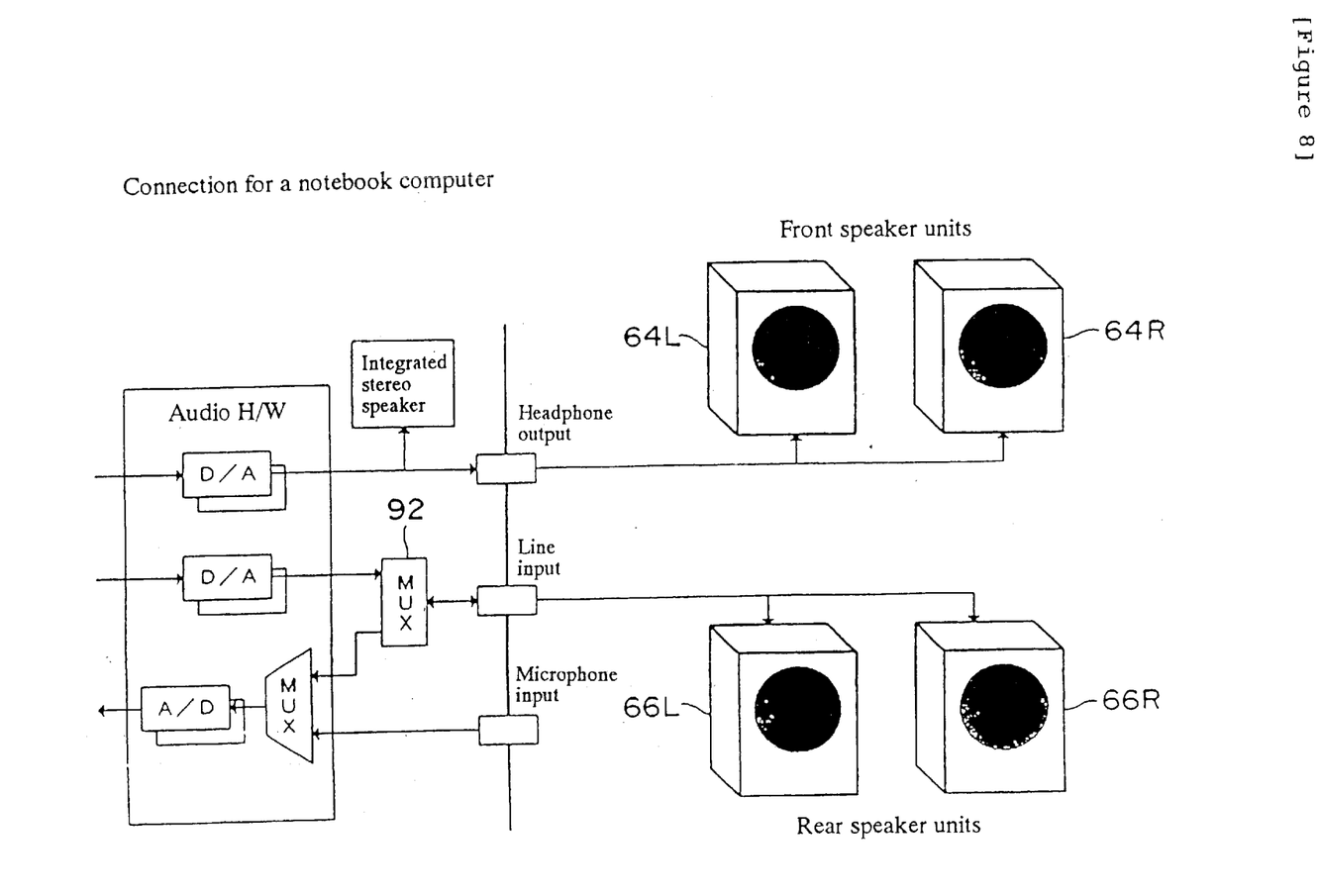
FIG. 8 is a schematic view showing an example of the manner of connection of the speaker units when the present invention is applied to a notebook PC.

In such a case, as shown in FIG. 8 as an example, a headphone terminal is used as the terminal intended for the connection of the front speaker units 64L and 64R, and a multiplexer (MUX) 92 is provided at some midpoint of the signal line connected to the line input terminal, so that when the rear speaker units 66L and 66R are connected to the line input terminal, the multiplexer 92 is switched to output the sound data output from the D/A converter to the rear speaker units 66L and 66R via the line input terminal. In this way, four speaker units can be connected to the PC without providing any PC with any new terminal.

Furthermore, while an implementation has been explained in the above description, in which if the absolute value $|q_F-q_R|$ of the difference between the phase difference $q_F$ of the front speaker units and the phase difference $q_R$ of the rear speaker units is equal to or greater than 90°, the phases of the sound signals input to the rear speaker units are inverted, the present invention is not limited to this implementation, and the phases of the sound signals input to the front speaker units may be inverted.

And, in addition to the phase inversion, the phases of the sound signals of the front and rear speaker units may be altered relative to each other to reduce $|q_F-q_R|$ to 0. This may be accomplished by choosing as a target for phase alteration one of the sound signals generated from the front and rear speaker units which corresponds to the sound whose phase leads the other at the listening position, and delaying the timing of outputting the sound data by a time corresponding to $|q_F-q_R|$ by repeatedly performing the steps of temporarily storing the digital sound data prior to being converted into the analog signal on a buffer, and outputting it after a lapse of a time corresponding to $|q_F-q_R|$. Here, the above-mentioned process may be applied to the configuration in which two speaker units are provided, to match the phase of the sound generated from the left-side speaker and detected at the listening position to that of the sound generated from the right-side speaker and detected at the listening position.

Furthermore, while the PC 12 has been taken as an example of the sound reproducing unit according to the present invention, and explained in the above description, the present invention is not limited to this implementation, and may be applied to various kinds of apparatus with a feature for reproducing sound recorded on the recording medium in digital or analog form, or are received via radio or cable communication (for example, audio unit, or television set or the like).

Furthermore, while an implementation has been explained in the above description in which the PC 12 serves as the sound reproducing unit according to the present invention in the manner that the programs for adjusting phase and inverting phase intended to implement the method for adjusting phase according to the present invention are initially stored on the information storage medium serving as the recording medium according to the present invention, and the programs are then installed from the information storage medium to the PC 12 according to the present invention and executed by it, the PC 12 may be caused to serve as the sound reproducing unit according to the present invention in the manner that the above programs are initially stored on a storage device in another information processing unit (for example, network server) connected to the PC 12 via a public telephone line, or a communication media (such as an optical fiber, or a radio network) in a computer network system (for example, LAN, Internet, or radio communication network), and when the PC 12 communicates with the information processing unit, the programs are transmitted from the information processing unit to the PC 12 via the communication media (transmission media), and then the PC 12 installs the transmitted programs in a storage means, such as a HDD 40 or the like, and executes them.

As described above, since for each of a plurality of speaker units, a predetermined reference sound signal is input to a single speaker unit, a sound generated from the single speaker unit is detected with sound detecting means disposed at a predetermined listening position, and a phase difference between the predetermined reference sound signal and a sound signal output from the sound detecting means is detected, and a phase of a sound signal input to each speaker unit relative to each other when the sound is reproduced is altered to lessen a deviation of the phase difference detected for each of the plurality of speaker units respectively, the present invention advantageously has an excellent effect of allowing a significant deterioration of the quality of the reproduced sound to be avoided regardless of the configurations of the speaker units used for reproducing sound.

What is claimed is:

1. A method for use in a computer for adjusting a phase of a sound signal from front and rear sets of speaker units disposed at different positions relative to a listening position, comprising the steps of:

inputting a predetermined sinusoidal reference sound signal to one set of speaker unit of said front and rear sets of speaker units;

detecting a sound generated from said one speaker unit with a sound detector disposed at said listening position;

detecting a phase difference between a sound signal output from said sound detector in response to said sound generated from the one speaker unit and said predetermined reference sound signal;

repeating the above steps for each of the weaker units; and adjusting the phase of a sound signal to each set of speaker units for replaying with each other by inverting the signals to one set if a deviation of an average phase difference detected for one set of speaker units relative to the other set exceeds a preselected deviation.

2. Sound reproducing apparatus for a plurality of computer speaker units, comprising:

logic for determining a front and rear position of respective sets of said speaker units;

a sound signal generator generating a plurality of channels of sound signals intended to be input to plurality of speaker units respectively;

a phase difference detector that, for each of said plurality of speaker units, inputs a predetermined sinusoidal reference sound signal to a single speaker unit of said plurality of speaker units, and detects a phase difference between said predetermined reference sound signal and a sound signal output from a sound detector as a result of detecting a sound generated from the single speaker unit with said sound detector disposed at a predetermined listening position; and a phase adjuster that inverts a phase of a sound signal input to one of the sets of speaker units from said sound signal generator relative to the other set to lessen a deviation of the phase difference detected for each of the plurality of speaker units if an average deviation for one set differs from the average deviation for the other set by more than a preselected number of degrees of the sinusoidal reference signal.

3. The apparatus according to claim 2, comprising a computer, wherein said plurality of speaker units are external speaker units connected to sound signal output terminals of said computer and said preselected number of degrees is 90 degrees of the sinusoidal reference sound signal.

4. The apparatus according to claim 2, wherein said sound signal generator generates a plurality of channels of sound signals by reading data recorded on a sound track of a DVD storage medium, and decoding the read data and the preselected number is ninety degrees.

5. The apparatus according to claim 2, wherein said phase adjuster inverts the phases of the sound signals input to each speaker unit of the rear set to lessen a deviation of the phase difference detected respectively for each of said plurality of speaker units.

6. The apparatus according to claim 2, wherein said plurality of speaker units comprises a front set of two or more speaker units disposed toward the front of said listening position, and a rear set of two speaker units intended to provide surrounding effect disposed toward the rear of said listening position, and said phase adjuster inverts the phase of the sound signal input to the set of speaker units disposed toward the rear of said listening position, to lessen a deviation of the phase difference between the phase difference detected for the speaker units disposed toward the rear of said listening position and phase difference detected for the speaker units disposed toward the front of said listening position.

7. A recording medium having recorded thereon computer-executable program code for causing a computer to execute a process comprising:

a first step of, for each of a plurality of speaker units, inputting a predetermined sinusoidal reference sound signal to single speaker unit of the plurality of speaker units to which a plurality of channels of sound signals generated by a sound signal generator are input respectively, and detecting phase difference between said predetermined reference sound signal and a sound signal output from a sound detector as a result of detecting a sound generated from said single speaker unit with said sound detector disposed at a predetermined listening position;

a second step of determining which set of the speaker units is a rear set and which set is a front set; and a third step of inverting a phase of a sound signal input to each of one set of speaker units from said sound signal generator relative to each of the other set to lesson a deviation of the phase difference detected respectively for each of the plurality of speaker units if the deviation for one set exceeds the deviation for the other set by a preselected amount.

8. The recording medium of claim 7 wherein the preselected amount is ninety degrees of the sinusoidal signal.

* * * * *